(12) United States Patent
Novotny et al.

(10) Patent No.: US 10,075,688 B2
(45) Date of Patent: *Sep. 11, 2018

(54) LASER LIGHTING HAVING SELECTIVE RESOLUTION

(71) Applicant: Soraa Laser Diode, Inc., Goleta, CA (US)

(72) Inventors: Vlad Joseph Novotny, Los Gatos, CA (US); Paul Rudy, Goleta, CA (US)

(73) Assignee: Soraa Laser Diode, Inc., Goleta, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/728,411

(22) Filed: Oct. 9, 2017

(65) Prior Publication Data
US 2018/0035092 A1  Feb. 1, 2018

Related U.S. Application Data

(63) Continuation of application No. 14/878,676, filed on Oct. 8, 2015, now Pat. No. 9,787,963.

(51) Int. Cl.
H04N 9/77 (2006.01)
H04N 9/31 (2006.01)
(Continued)

(52) U.S. Cl.
CPC ............... H04N 9/77 (2013.01); F21K 9/64 (2016.08); G02B 26/105 (2013.01);
(Continued)

(58) Field of Classification Search
CPC ........ H04N 9/77; H04N 9/312; H04N 9/3135; H04N 9/3144; H04N 9/3188; F21K 9/56; F21K 9/64; G02B 26/105; G02B 27/0101
(Continued)

(56) References Cited

U.S. PATENT DOCUMENTS 4,318,058 A  3/1982 Milo et al.
4,341,592 A  7/1982 Shortes et al.
(Continued)

FOREIGN PATENT DOCUMENTS

CN  1655371  8/2005

OTHER PUBLICATIONS

Non-Final Office Action dated Sep. 24, 2012 for U.S. Appl. No. 12/789,303, 19 pages.
(Continued)

Primary Examiner — Paulos M Natnael
Assistant Examiner — Sean Haiem
(74) Attorney, Agent, or Firm — Kilpatrick Townsend & Stockton LLP

(57) ABSTRACT

In an example, the present invention provides an optical engine apparatus. The apparatus has a laser diode device, the laser diode device characterized by a wavelength ranging from 300 to 2000 nm or any variations thereof. In an example, the apparatus has a lens coupled to an output of the laser diode device and a scanning mirror device operably coupled to the laser diode device. In an example, the apparatus has an un-patterned phosphor plate coupled to the scanning mirror and configured with the laser device; and a spatial image formed on a portion of the un-patterned phosphor plate configured by a modulation of the laser and movement of the scanning mirror device.

15 Claims, 9 Drawing Sheets

(51) Int. Cl.
*F21K 9/64* (2016.01)
*G02B 26/10* (2006.01)
*G02B 27/01* (2006.01)

(52) U.S. Cl.
CPC ......... *G02B 27/0101* (2013.01); *H04N 9/312* (2013.01); *H04N 9/3129* (2013.01); *H04N 9/3135* (2013.01); *H04N 9/3144* (2013.01); *H04N 9/3188* (2013.01); *G02B 2027/0112* (2013.01)

(58) Field of Classification Search
USPC ............... 348/196; 345/7; 359/246, 567; 362/607; 385/4
See application file for complete search history.

(56) References Cited

U.S. PATENT DOCUMENTS

| | | |
|---|---|---|
| 4,860,687 A | 8/1989 | Frijlink |
| 4,911,102 A | 3/1990 | Manabe et al. |
| 5,331,654 A | 7/1994 | Jewell et al. |
| 5,334,277 A | 8/1994 | Nakamura |
| 5,366,953 A | 11/1994 | Char et al. |
| 5,527,417 A | 6/1996 | Lida et al. |
| 5,607,899 A | 3/1997 | Yoshida et al. |
| 5,632,812 A | 5/1997 | Hirabayashi |
| 5,647,945 A | 7/1997 | Matsuse et al. |
| 5,696,389 A | 12/1997 | Ishikawa et al. |
| 5,821,555 A | 10/1998 | Saito et al. |
| 5,888,907 A | 3/1999 | Tomoyasu et al. |
| 5,926,493 A | 7/1999 | O'Brien et al. |
| 5,951,923 A | 9/1999 | Rorie et al. |
| 6,069,394 A | 5/2000 | Hashimoto et al. |
| 6,072,197 A | 6/2000 | Horino et al. |
| 6,147,953 A | 11/2000 | Duncan |
| 6,153,010 A | 11/2000 | Kiyoku et al. |
| 6,167,169 A * | 12/2000 | Brinkman ............... G02F 1/011 385/10 |
| 6,195,381 B1 | 2/2001 | Botez et al. |
| 6,239,454 B1 | 5/2001 | Glew et al. |
| 6,283,597 B1 | 9/2001 | Jorke |
| 6,379,985 B1 | 4/2002 | Cervantes et al. |
| 6,451,157 B1 | 9/2002 | Hubacek |
| 6,489,636 B1 | 12/2002 | Goetz et al. |
| 6,586,762 B2 | 7/2003 | Kozaki |
| 6,635,904 B2 | 10/2003 | Goetz et al. |
| 6,639,925 B2 | 10/2003 | Niwa et al. |
| 6,680,959 B2 | 1/2004 | Tanabe et al. |
| 6,734,461 B1 | 5/2004 | Shiomi et al. |
| 6,755,932 B2 | 6/2004 | Masuda et al. |
| 6,809,781 B2 | 10/2004 | Setlur et al. |
| 6,814,811 B2 | 11/2004 | Ose |
| 6,833,564 B2 | 12/2004 | Shen et al. |
| 6,858,081 B2 | 2/2005 | Biwa et al. |
| 6,858,882 B2 | 2/2005 | Tsuda et al. |
| 6,920,166 B2 | 7/2005 | Akasaka et al. |
| 7,009,199 B2 | 3/2006 | Hall |
| 7,019,325 B2 | 3/2006 | Li et al. |
| 7,033,858 B2 | 4/2006 | Chai et al. |
| 7,053,413 B2 | 5/2006 | D'Evelyn et al. |
| 7,063,741 B2 | 6/2006 | D'Evelyn |
| 7,128,849 B2 | 10/2006 | Setlur et al. |
| 7,220,324 B2 | 5/2007 | Baker et al. |
| 7,303,630 B2 | 12/2007 | Motoki et al. |
| 7,312,156 B2 | 12/2007 | Granneman et al. |
| 7,323,723 B2 | 1/2008 | Ohtsuka et al. |
| 7,338,828 B2 | 3/2008 | Imer et al. |
| 7,358,542 B2 | 4/2008 | Radkov et al. |
| 7,358,543 B2 | 4/2008 | Chua et al. |
| 7,390,359 B2 | 6/2008 | Miyanaga et al. |
| 7,470,555 B2 | 12/2008 | Matsumura |
| 7,483,466 B2 | 1/2009 | Uchida et al. |
| 7,483,468 B2 | 1/2009 | Tanaka |
| 7,489,441 B2 | 2/2009 | Scheible et al. |
| 7,491,984 B2 | 2/2009 | Koike et al. |
| 7,555,025 B2 | 6/2009 | Yoshida |
| 7,598,104 B2 | 10/2009 | Teng et al. |
| 7,691,658 B2 | 4/2010 | Kaeding et al. |
| 7,709,284 B2 | 5/2010 | Iza et al. |
| 7,727,332 B2 | 6/2010 | Habel et al. |
| 7,733,571 B1 | 6/2010 | Li |
| 7,749,326 B2 | 7/2010 | Kim et al. |
| 7,806,078 B2 | 10/2010 | Yoshida |
| 7,858,408 B2 | 12/2010 | Mueller et al. |
| 7,862,761 B2 | 1/2011 | Okushima et al. |
| 7,923,741 B1 | 4/2011 | Zhai et al. |
| 7,939,354 B2 | 5/2011 | Kyono et al. |
| 7,968,864 B2 | 6/2011 | Akita et al. |
| 8,017,932 B2 | 9/2011 | Okamoto et al. |
| 8,044,412 B2 | 10/2011 | Murphy et al. |
| 8,124,996 B2 | 2/2012 | Raring et al. |
| 8,126,024 B1 | 2/2012 | Raring |
| 8,143,148 B1 | 3/2012 | Raring et al. |
| 8,148,801 B2 | 4/2012 | D'Evelyn |
| 8,242,522 B1 | 8/2012 | Raring |
| 8,247,887 B1 | 8/2012 | Raring et al. |
| 8,252,662 B1 | 8/2012 | Poblenz et al. |
| 8,254,425 B1 | 8/2012 | Raring |
| 8,259,769 B1 | 9/2012 | Raring et al. |
| 8,284,810 B1 | 10/2012 | Sharma et al. |
| 8,294,179 B1 | 10/2012 | Raring |
| 8,314,429 B1 | 11/2012 | Raring et al. |
| 8,351,478 B2 | 1/2013 | Raring et al. |
| 8,355,418 B2 | 1/2013 | Raring et al. |
| 8,416,825 B1 | 4/2013 | Raring et al. |
| 8,422,525 B1 | 4/2013 | Raring et al. |
| 8,427,590 B2 | 4/2013 | Raring |
| 8,451,876 B1 | 5/2013 | Raring et al. |
| 8,509,275 B1 | 8/2013 | Raring et al. |
| 8,582,038 B1 | 11/2013 | Raring et al. |
| 8,717,505 B1 | 5/2014 | Raring et al. |
| 8,730,410 B1 | 5/2014 | Raring et al. |
| 8,749,719 B2 | 6/2014 | Raring et al. |
| 8,773,598 B2 | 7/2014 | Raring et al. |
| 9,013,638 B2 | 4/2015 | Raring et al. |
| 9,019,437 B2 | 4/2015 | Raring et al. |
| 9,071,772 B2 | 6/2015 | Raring et al. |
| 9,787,963 B2 | 10/2017 | Novotny et al. |
| 9,800,017 B1 * | 10/2017 | Raring ............... H01S 5/0428 |
| 2001/0048114 A1 | 12/2001 | Morita et al. |
| 2002/0027933 A1 | 3/2002 | Tanabe et al. |
| 2002/0105986 A1 | 8/2002 | Yamasaki |
| 2002/0171092 A1 | 11/2002 | Goetz et al. |
| 2003/0000453 A1 | 1/2003 | Unno et al. |
| 2003/0001238 A1 | 1/2003 | Ban |
| 2003/0012243 A1 | 1/2003 | Okumura |
| 2003/0020087 A1 | 1/2003 | Goto et al. |
| 2003/0129810 A1 | 7/2003 | Barth et al. |
| 2003/0140846 A1 | 7/2003 | Biwa et al. |
| 2003/0178617 A1 | 9/2003 | Appenzeller et al. |
| 2003/0200931 A1 | 10/2003 | Goodwin |
| 2003/0216011 A1 | 11/2003 | Nakamura et al. |
| 2004/0012027 A1 | 1/2004 | Keller et al. |
| 2004/0025787 A1 | 2/2004 | Selbrede et al. |
| 2004/0060518 A1 | 4/2004 | Nakamura et al. |
| 2004/0099213 A1 | 5/2004 | Adomaitis et al. |
| 2004/0104391 A1 | 6/2004 | Maeda et al. |
| 2004/0146264 A1 | 7/2004 | Auner et al. |
| 2004/0151222 A1 | 8/2004 | Sekine |
| 2004/0196877 A1 | 10/2004 | Kawakami et al. |
| 2004/0222357 A1 | 11/2004 | King et al. |
| 2004/0233950 A1 | 11/2004 | Furukawa et al. |
| 2004/0247275 A1 | 12/2004 | Vakhshoori et al. |
| 2004/0262624 A1 | 12/2004 | Akita et al. |
| 2005/0040384 A1 | 2/2005 | Tanaka et al. |
| 2005/0072986 A1 | 4/2005 | Sasaoka |
| 2005/0168564 A1 | 8/2005 | Kawaguchi et al. |
| 2005/0214992 A1 | 9/2005 | Chakraborty et al. |
| 2005/0218413 A1 | 10/2005 | Matsumoto et al. |
| 2005/0224826 A1 | 10/2005 | Keuper et al. |
| 2005/0229855 A1 | 10/2005 | Raaijmakers |
| 2005/0230701 A1 | 10/2005 | Huang |
| 2005/0286591 A1 | 12/2005 | Lee |
| 2006/0030738 A1 | 2/2006 | Vanmaele et al. |

(56) References Cited

U.S. PATENT DOCUMENTS

| | | |
|---|---|---|
| 2006/0033009 A1 | 2/2006 | Kobayashi et al. |
| 2006/0037529 A1 | 2/2006 | D'Evelyn |
| 2006/0038193 A1 | 2/2006 | Wu et al. |
| 2006/0060131 A1 | 3/2006 | Atanackovic |
| 2006/0066319 A1 | 3/2006 | Dallenbach et al. |
| 2006/0077795 A1 | 4/2006 | Kitahara et al. |
| 2006/0078022 A1 | 4/2006 | Kozaki et al. |
| 2006/0079082 A1 | 4/2006 | Bruhns et al. |
| 2006/0086319 A1 | 4/2006 | Kasai et al. |
| 2006/0118799 A1 | 6/2006 | D'Evelyn et al. |
| 2006/0126688 A1 | 6/2006 | Kneissl |
| 2006/0144334 A1 | 7/2006 | Yim et al. |
| 2006/0175624 A1 | 8/2006 | Sharma et al. |
| 2006/0189098 A1 | 8/2006 | Edmond |
| 2006/0193359 A1 | 8/2006 | Kuramoto |
| 2006/0205199 A1 | 9/2006 | Baker et al. |
| 2006/0213429 A1 | 9/2006 | Motoki et al. |
| 2006/0216416 A1 | 9/2006 | Sumakeris et al. |
| 2006/0256482 A1 | 11/2006 | Araki et al. |
| 2006/0284790 A1* | 12/2006 | Tegreene ............. G02B 26/101 345/7 |
| 2006/0288928 A1 | 12/2006 | Eom et al. |
| 2007/0081857 A1 | 4/2007 | Yoon |
| 2007/0086916 A1 | 4/2007 | LeBoeuf et al. |
| 2007/0093073 A1 | 4/2007 | Farrell et al. |
| 2007/0101932 A1 | 5/2007 | Schowalter et al. |
| 2007/0110112 A1 | 5/2007 | Sugiura |
| 2007/0120141 A1 | 5/2007 | Moustakas et al. |
| 2007/0153866 A1 | 7/2007 | Shchegrov et al. |
| 2007/0163490 A1 | 7/2007 | Habel et al. |
| 2007/0166853 A1 | 7/2007 | Guenthe et al. |
| 2007/0184637 A1 | 8/2007 | Haskell et al. |
| 2007/0190758 A1 | 8/2007 | Kaeding et al. |
| 2007/0217462 A1 | 9/2007 | Yamasaki |
| 2007/0242716 A1 | 10/2007 | Samal et al. |
| 2007/0252164 A1 | 11/2007 | Zhong et al. |
| 2007/0259464 A1 | 11/2007 | Bour et al. |
| 2007/0280320 A1 | 12/2007 | Feezell et al. |
| 2008/0006831 A1 | 1/2008 | Ng |
| 2008/0029152 A1 | 2/2008 | Milshtein et al. |
| 2008/0087919 A1 | 4/2008 | Tysoe et al. |
| 2008/0092812 A1 | 4/2008 | McDiarmid et al. |
| 2008/0095492 A1 | 4/2008 | Son et al. |
| 2008/0121916 A1 | 5/2008 | Teng et al. |
| 2008/0124817 A1 | 5/2008 | Bour et al. |
| 2008/0143976 A1 | 6/2008 | Yokoyama et al. |
| 2008/0149949 A1 | 6/2008 | Nakamura et al. |
| 2008/0149959 A1 | 6/2008 | Nakamura et al. |
| 2008/0164578 A1 | 7/2008 | Tanikella et al. |
| 2008/0173735 A1 | 7/2008 | Mitrovic et al. |
| 2008/0191192 A1 | 8/2008 | Feezell et al. |
| 2008/0191223 A1 | 8/2008 | Nakamura et al. |
| 2008/0198881 A1 | 8/2008 | Farrell et al. |
| 2008/0210958 A1 | 9/2008 | Senda et al. |
| 2008/0217745 A1 | 9/2008 | Miyanaga et al. |
| 2008/0232416 A1 | 9/2008 | Okamoto et al. |
| 2008/0251020 A1 | 10/2008 | Franken et al. |
| 2008/0283851 A1 | 11/2008 | Akita |
| 2008/0285609 A1 | 11/2008 | Ohta et al. |
| 2008/0291961 A1 | 11/2008 | Kamikawa et al. |
| 2008/0298409 A1 | 12/2008 | Yamashita et al. |
| 2008/0303033 A1 | 12/2008 | Brandes |
| 2008/0308815 A1 | 12/2008 | Kasai et al. |
| 2008/0315179 A1 | 12/2008 | Kim et al. |
| 2009/0021723 A1 | 1/2009 | De Lega |
| 2009/0058532 A1 | 3/2009 | Kikkawa et al. |
| 2009/0066241 A1 | 3/2009 | Yokoyama |
| 2009/0078944 A1 | 3/2009 | Kubota et al. |
| 2009/0080857 A1 | 3/2009 | St John-Larkin |
| 2009/0081857 A1 | 3/2009 | Hanser et al. |
| 2009/0081867 A1 | 3/2009 | Taguchi et al. |
| 2009/0141765 A1 | 6/2009 | Kohda et al. |
| 2009/0153752 A1 | 6/2009 | Silverstein |
| 2009/0159869 A1 | 6/2009 | Ponce et al. |
| 2009/0229519 A1 | 9/2009 | Saitoh |
| 2009/0250686 A1 | 10/2009 | Sato et al. |
| 2009/0267100 A1 | 10/2009 | Miyake et al. |
| 2009/0273005 A1 | 11/2009 | Lin |
| 2009/0301387 A1 | 12/2009 | D'Evelyn |
| 2009/0301388 A1 | 12/2009 | D'Evelyn |
| 2009/0309110 A1 | 12/2009 | Raring et al. |
| 2009/0309127 A1 | 12/2009 | Raring et al. |
| 2009/0316116 A1 | 12/2009 | Melville et al. |
| 2009/0320744 A1 | 12/2009 | D'Evelyn |
| 2009/0321778 A1 | 12/2009 | Chen et al. |
| 2010/0001300 A1 | 1/2010 | Raring et al. |
| 2010/0003492 A1 | 1/2010 | D'Evelyn |
| 2010/0006546 A1 | 1/2010 | Young et al. |
| 2010/0006873 A1 | 1/2010 | Raring et al. |
| 2010/0025656 A1 | 2/2010 | Raring et al. |
| 2010/0031875 A1 | 2/2010 | D'Evelyn |
| 2010/0044718 A1 | 2/2010 | Hanser et al. |
| 2010/0067088 A1* | 3/2010 | Novotny ............... G02B 27/48 359/246 |
| 2010/0096615 A1 | 4/2010 | Okamoto et al. |
| 2010/0104495 A1 | 4/2010 | Kawabata et al. |
| 2010/0140745 A1 | 6/2010 | Khan et al. |
| 2010/0151194 A1 | 6/2010 | D'Evelyn |
| 2010/0195687 A1 | 8/2010 | Okamoto et al. |
| 2010/0220262 A1 | 9/2010 | DeMille et al. |
| 2010/0276663 A1 | 11/2010 | Enya et al. |
| 2010/0295054 A1 | 11/2010 | Okamoto et al. |
| 2010/0302464 A1 | 12/2010 | Raring et al. |
| 2010/0309943 A1 | 12/2010 | Chakraborty et al. |
| 2010/0316075 A1 | 12/2010 | Raring et al. |
| 2010/0327291 A1 | 12/2010 | Preble et al. |
| 2011/0031508 A1 | 2/2011 | Hamaguchi et al. |
| 2011/0057167 A1 | 3/2011 | Ueno et al. |
| 2011/0064100 A1 | 3/2011 | Raring et al. |
| 2011/0064101 A1 | 3/2011 | Raring et al. |
| 2011/0064102 A1 | 3/2011 | Raring et al. |
| 2011/0073888 A1 | 3/2011 | Ueno et al. |
| 2011/0075694 A1 | 3/2011 | Yoshizumi et al. |
| 2011/0103418 A1 | 5/2011 | Hardy et al. |
| 2011/0129669 A1 | 6/2011 | Fujito et al. |
| 2011/0150020 A1 | 6/2011 | Haase et al. |
| 2011/0186874 A1 | 8/2011 | Shum |
| 2011/0186887 A1 | 8/2011 | Trottier et al. |
| 2011/0188530 A1 | 8/2011 | Lell et al. |
| 2011/0216795 A1 | 9/2011 | Hsu et al. |
| 2011/0247556 A1 | 10/2011 | Raring et al. |
| 2011/0273906 A1* | 11/2011 | Nichol ................ G02B 6/0076 362/607 |
| 2011/0286489 A1 | 11/2011 | Yang et al. |
| 2012/0104359 A1 | 5/2012 | Felker et al. |
| 2012/0178198 A1 | 7/2012 | Raring et al. |
| 2012/0187371 A1 | 7/2012 | Raring et al. |
| 2012/0314398 A1 | 12/2012 | Raring et al. |
| 2013/0022064 A1 | 1/2013 | Raring et al. |
| 2013/0314613 A1 | 11/2013 | Raring et al. |
| 2013/0314614 A1 | 11/2013 | Raring et al. |
| 2014/0226079 A1 | 8/2014 | Raring et al. |
| 2014/0253697 A1 | 9/2014 | Raring et al. |
| 2014/0267937 A1 | 9/2014 | Raring et al. |
| 2014/0293139 A1 | 10/2014 | Raring et al. |
| 2015/0103404 A1* | 4/2015 | Rudy ...................... G02B 6/00 359/567 |
| 2016/0347236 A1* | 12/2016 | Yatsuda ................ B60Q 1/085 |
| 2017/0051883 A1* | 2/2017 | Raring .................... H01S 5/005 |
| 2017/0057399 A1* | 3/2017 | Yatsuda ............... F21S 48/1258 |
| 2017/0189228 A1* | 7/2017 | Yang ...................... A61F 9/008 |

OTHER PUBLICATIONS

Notice of Allowance dated Dec. 21, 2012 for U.S. Appl. No. 12/789,303, 7 pages.

Notice of Allowance dated Sep. 3, 2013 for U.S. Appl. No. 13/853,694, 12 pages.

Notice of Allowance dated Dec. 10, 2013 for U.S. Appl. No. 13/739,961, 15 pages.

Notice of Allowance dated Jan. 11, 2014 for U.S. Appl. No. 14/035,045, 9 pages.

(56) References Cited

OTHER PUBLICATIONS

Notice of Allowance dated Jan. 24, 2014 for U.S. Appl. No. 13/678,101, 12 pages.
Notice of Allowance dated Mar. 4, 2014 for U.S. Appl. No. 13/678,122, 31 pages.
Non-Final Office Action dated Oct. 8, 2014 for U.S. Appl. No. 14/199,672, 22 pages.
Non-Final Office Action dated Dec. 22, 2014 for U.S. Appl. No. 14/262,208, 25 pages.
Notice of Allowance dated Feb. 27, 2015 for U.S. Appl. No. 14/307,214, 9 pages.
Notice of Allowance dated Feb. 2, 2015 for U.S. Appl. No. 14/199,672, 7 pages.
Notice of Allowance dated Apr. 23, 2015 for U.S. Appl. No. 14/262,208; 5 pages.
U.S. Appl. No. 14/878,676 Non-Final Office Action dated Jul. 15, 2016, 17 pages.
U.S. Appl. No. 14/878,676 Final Office Action dated Mar. 10, 2017, 16 pages.
U.S. Appl. No. 14/878,676 Notice of Allowance dated Jun. 8, 2017, 5 pages.

* cited by examiner

LASER LIGHTING HAVING SELECTIVE RESOLUTION

CROSS-REFERENCES TO RELATED APPLICATIONS

This application is a continuation of U.S. patent application Ser. No. 14/878,676, filed Oct. 8, 2015, the entire contents of which are incorporated herein by reference for all purposes.

BACKGROUND

Large displays are becoming increasingly popular and are expected to gain further traction in the coming years as Liquid Crystal Displays (LCD) get cheaper for television (TV) and digital advertising becomes more popular at gas stations, malls, and coffee shops. Substantial growth (e.g., over 40%) has been seen in the past several years for large format displays (e.g., >40 inch TVs), and consumers have grown accustomed to larger displays for laptops and Personal Computers (PC) as well. As more viewing content is available via mobile devices such as TV, internet and video, displays in handheld consumer electronics remain small (<6 inch) with the keyboard, camera, and other features competing for space and power.

Additionally, smart lighting is emerging as a large opportunity within the current $80B lighting market, where sensors and connectivity are introduced into the light source, as well as dynamic features related to the illumination.

Existing illumination sources have substantial shortcomings in meeting the needs of these important applications. Specifically, the delivered lumens per electrical watt of power consumption is typically quite low, due to the low efficiency of the source, the low spatial brightness of the source and very low optical efficiency of optical engines. Another key drawback is in the cost per delivered lumen, which, for existing sources, is typically high because of the poor optical efficiency. Another key shortcoming of the existing sources relates to the lack of dynamic functionality, specifically in their limited ability to generate dynamic spatial and color patterns in a compact form factor with high efficiency and low cost.

Therefore, improved systems for displaying images and video, and smart lighting are desired.

SUMMARY

According to the present invention, techniques for laser lighting are provided. Merely by way of example, the invention can be applied to applications such as white lighting, white spot lighting, flash lights, automobile headlights, all-terrain vehicle lighting, light sources used in recreational sports such as biking, surfing, running, racing, boating, light sources used for safety, drones, robots, counter measures in defense applications, multi-colored lighting, lighting for flat panels, medical, metrology, beam projectors and other displays, high intensity lamps, spectroscopy, entertainment, theater, music, and concerts, analysis fraud detection and/or authenticating, tools, water treatment, laser dazzlers, targeting, communications, transformations, transportations, leveling, curing and other chemical treatments, heating, cutting and/or ablating, pumping other optical devices, other optoelectronic devices and related applications, and source lighting and the monochromatic, black and white or full color projection displays and the like.

Optical engines with single laser light source, scanning mirror and un-patterned phosphor as well as engines with multiple lasers, scanning mirrors and un-patterned phosphors are disclosed. Multiple re-imaged phosphor architectures with transmission and reflection configurations, and color line and frame sequential addressing and parallel simultaneous addressing are described. These high power efficiency and small engines do not require any de-speckling for high image quality and offer adjustable, on demand resolution and color gamut for projection displays and smart lighting applications.

In an example, the present invention provides an optical engine apparatus. The apparatus has a laser diode device, the laser diode device characterized by a wavelength ranging from 300 to 2000 nm or any variations thereof. In an example, the apparatus has a lens coupled to an output of the laser diode device and a scanning mirror device operably coupled to the laser diode device. In an example, the apparatus has an un-patterned phosphor plate coupled to the scanning mirror and configured with the laser device; and a spatial image formed on the un-patterned phosphor plate configured by a modulation of the laser and movement of the scanning mirror device.

In an alternative example, the device has an optical engine apparatus. The apparatus has a laser diode device. In an example, the laser diode device is characterized by a wavelength. In an example, the apparatus has a lens coupled to an output of the laser diode device. The apparatus has a scanning mirror device operably coupled to the laser diode device and an un-patterned phosphor plate coupled to the scanning mirror and configured with the laser device. The apparatus has a spatial image formed on a portion of the un-patterned phosphor plate configured by a modulation of the laser and movement of the scanning mirror device. In a preferred embodiment, the apparatus has a resolution associated with the spatial image, the resolution being selected from one of a plurality of pre-determined resolutions. In an example, the resolution is provided by control parameter associated with the spatial image.

In an example, the apparatus has a color or colors associated with the spatial image, the color or colors being associated with the modulation of the laser device and movement of the scanning mirror device. In an example, the apparatus has another spatial image formed on the second color un-patterned phosphor plate. In an example, the other spatial image having another or same resolution and different color. In an example, the other spatial image is output concurrently or simultaneously with the spatial image on the first color un-patterned phosphor plate. In an example, the spatial image is characterized by a time constant. In an example, the control parameter is provided by a controller coupled to the laser diode device and the scanning mirror device. In an example, the spatial image is speckle free.

In an example, the apparatus has an efficiency of greater than 10% to 80% based upon an input power to the laser diode device and an output of the spatial image. In an example, the apparatus has a direct view of the spatial image by a user.

In an example, the present invention has an optical engine apparatus. The apparatus has a laser diode device. In an example, the laser diode device characterized by a wavelength ranging from 300 to 2000 nm, although there can be variations. In an example, the apparatus has a lens coupled to an output of the laser diode device. The apparatus has a scanning mirror device operably coupled to the laser diode device. The apparatus has a beam path provided from the scanning mirror. The apparatus has a first color un-patterned phosphor plate coupled to the scanning mirror via the beam path and configured with the laser device, a second color un-patterned phosphor plate coupled to the scanning mirror via the beam path and configured with the laser device, and a third color un-patterned phosphor plate coupled to the scanning mirror via the beam path and configured with the laser device. In an example, the apparatus has a spatial image formed on a portion of either the first color un-patterned phosphor plate, the second color un-patterned phosphor plate, or the third color un-patterned phosphor plate, or over all three un-patterned phosphor plates configured by a modulation of the laser and movement of the scanning mirror device.

In an example, the apparatus has a first blocking mirror configured in a first portion of the beam path to configure the beam path to the first un-patterned phosphor plate; a second blocking mirror configured to a second portion of the beam path to configure the beam path to the second un-patterned phosphor plate.

In an example, the apparatus has a controller coupled to the laser diode device and the scanning mirror device, and configured to generate the spatial image on the portion of the un-patterned phosphor.

In an example, the un-patterned phosphor plate comprises a multi-element phosphor species. In an example, the multi-element phosphor species comprises a red phosphor, a green phosphor, and a blue phosphor.

In an example, the un-patterned phosphor plate comprises a plurality of color phosphor sub-plates.

In an example, the scanning mirror device comprises a plurality of scanning mirrors. In an example, the un-patterned phosphor is included on the scanning mirror. In an example, an three dimensional (3D) display apparatus comprises one or more laser diodes, one or more scanning mirrors and one or more un-patterned phosphors to generate two stereoscopic images for the left and right eyes.

In an example, the apparatus is configured with a display system. In an example, the un-patterned phosphor plate comprises a red phosphor, a green phosphor, or a blue phosphor within a spatial region of the un-patterned phosphor plate.

In an example, the apparatus has a heat sink device coupled to the un-patterned phosphor plate such that thermal energy is transferred and removed using the heat sink device; and wherein the un-patterned phosphor plate includes at least one of a transmissive phosphor species or a reflective phosphor species.

Various benefits are achieved over pre-existing techniques using the present invention. In particular, the present invention enables a cost-effective projection systems that utilize efficient light sources and result in high overall optical efficiency of the lighting or display system. In a specific embodiment, the light source can be manufactured in a relatively simple and cost effective manner. Depending upon the embodiment, the present apparatus and method can be manufactured using conventional materials and/or methods according to one of ordinary skill in the art. In one or more embodiments, the laser device is capable of multiple wavelengths. Of course, there can be other variations, modifications, and alternatives. Depending upon the embodiment, one or more of these benefits may be achieved. These and other benefits may be described throughout the present specification and more particularly below.

The present invention achieves these benefits and others in the context of known process technology. However, a further understanding of the nature and advantages of the present invention may be realized by reference to the latter portions of the specification and attached drawings.

DETAILED DESCRIPTION

According to the present invention, techniques for laser lighting are provided.

This description relates to optical and electrical designs, architecture and implementation of smart lighting and displays. The optical architecture is based on the single or multiple laser diodes, single or multiple scanning mirrors and single or multiple un-patterned phosphor plates.

As background, conventional displays use white light illumination and array of color filters and addressable Liquid Crystal Display (LCD) pixels on the panels, with pixels being turned on or off with or without light intensity control by addressing electronics. Another type of displays is formed by array of addressable pixels that generate light emission by electroluminescence (Organic Light Emitting Diode—OLED array). Yet another type of display is created by addressable array of deflectable micromirrors that reflect the color sequential, time division multiplexed light selectively to projection optics and a screen. Additionally, another type of color display that does not require the matrix of addressable elements is based on three color light sources and the biaxial scanning mirror that allows formation of images by scanning in two directions while three lasers or other light sources are directly modulated by driving currents. In addition, patterned phosphor plate with red, green and blue array of phosphor pixels can be addressed by laser light incident on scanning mirrors while the light intensities are controlled by laser drivers. Illumination patterns can be viewed directly, or re-imaged with an optical system to a desired surface.

The commonality of the matrix array display products is the fixed resolution of the displayed content, fixed color gamut, low power efficiency and optical and electrical complexity. The direct and re-imaged scanning mirror displays that do not use matrices of colored phosphor pixels offer adjustable resolution, higher power efficiency, and a compact footprint, but suffer from image speckle that is the result of coherent nature of laser light sources required for these displays, and also from safety issues, regulatory complexity, and high cost since 3 types of lasers with different wavelengths are required.

This disclosure describes novel displays and smart lighting that have resolution and color gamut on demand, very high power efficiency, no speckle and optical and electrical simplicity, miniature packaging, minimum number of active elements, and minimal safety and regulatory concerns. The multiple optical engine embodiments and several addressing schemes are disclosed.

Figure 1:
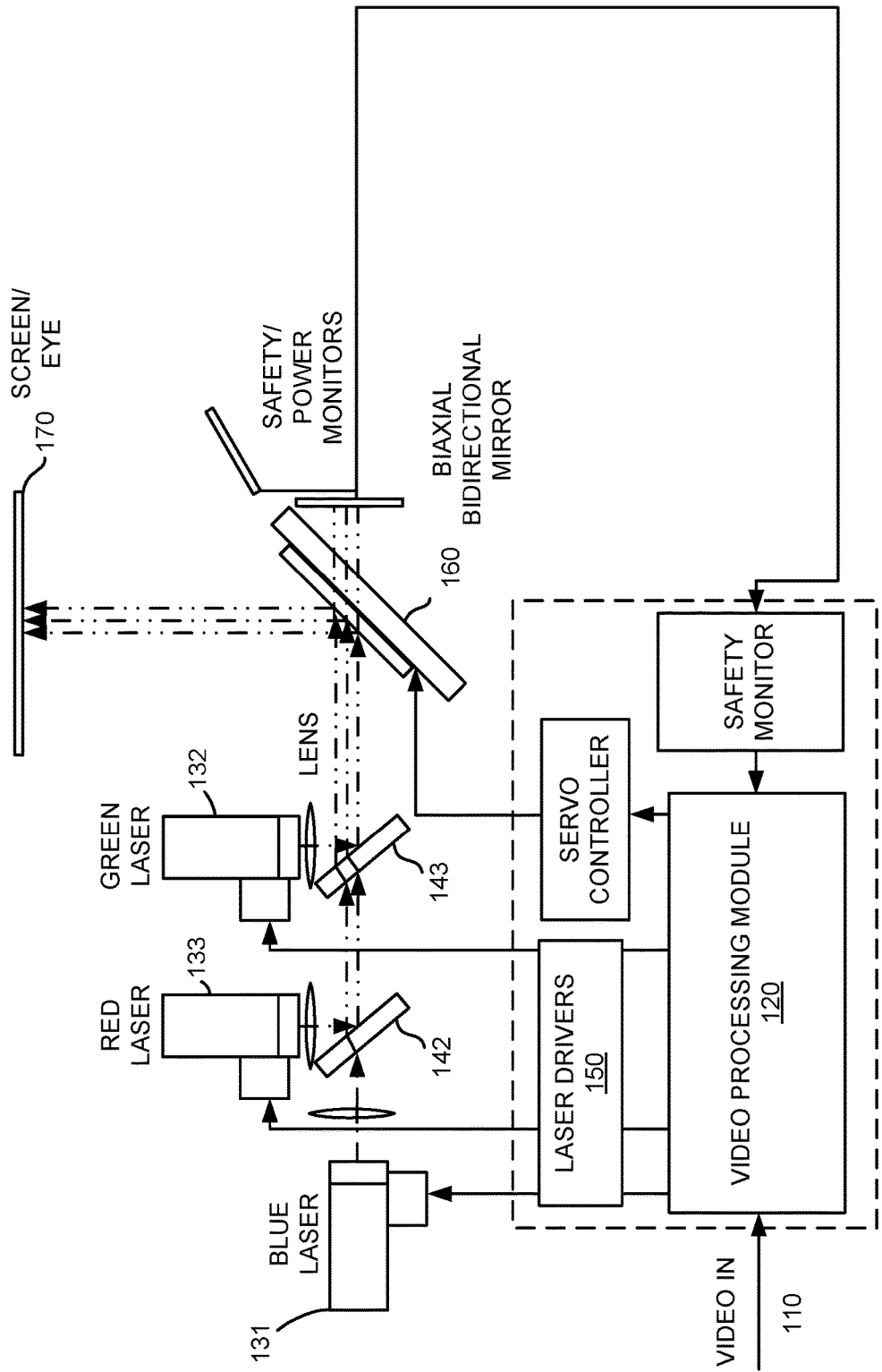
FIG. 1 is a simplified schematic diagram of the prior art, conventional scanning mirror display.

A prior art scanning mirror display architecture is outlined in FIG. 1. An example can be found in U.S. Pat. No. 9,100,590, in the name of Raring, et al. issued Aug. 4, 2015, and titled Laser based display method and system, commonly assigned and hereby incorporated by reference.

According to an example, a projection apparatus is provided. The projection apparatus includes a housing having an aperture. The apparatus also includes an input interface 110 for receiving one or more frames of images. The apparatus includes a video processing module 120. Additionally, the apparatus includes a laser source. The laser source includes a blue laser diode 131, a green laser diode 132, and a red laser diode 133. The blue laser diode is fabricated on a nonpolar or semipolar oriented Ga-containing substrate and has a peak operation wavelength of about 430 to 480 nm, although other wavelengths can be used. The green laser diode is fabricated on a nonpolar or semipolar oriented Ga-containing substrate and has a peak operation wavelength of about 490 nm to 540 nm. The red laser could be fabricated from AlInGaP with wavelengths 610 to 700 nm. The laser source is configured to produce a laser beam by combining outputs from the blue, green, and red laser diodes using dichroic mirrors 142 and 143. The apparatus also includes a laser driver module 150 coupled to the laser source. The laser driver module generates three drive currents based on a pixel from the one or more frames of images. Each of the three drive currents is adapted to drive a laser diode. The apparatus also includes a Micro-Electro-Mechanical System (MEMS) scanning mirror 160, or "flying mirror", configured to project the laser beam to a specific location through the aperture resulting in a single picture 170. By rastering the pixel in two dimensions, a complete image is formed. The apparatus includes an optical member provided within proximity of the laser source, the optical member being adapted to direct the laser beam to the MEMS scanning mirror. The apparatus includes a power source electrically coupled to the laser source and the MEMS scanning mirror.

Figure 2:
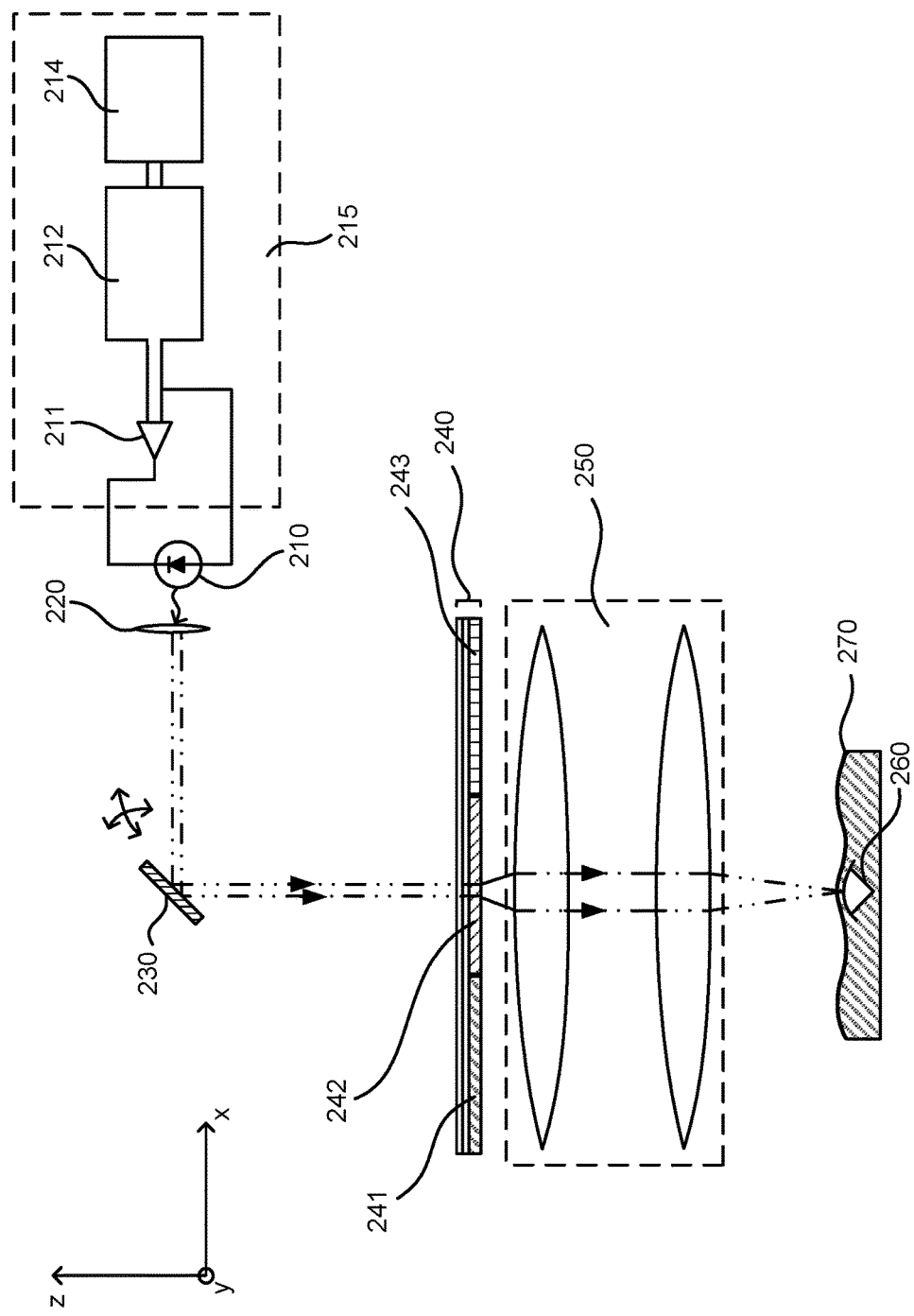
FIG. 2 is a simplified schematic diagram of novel architecture of the optical engine and addressing electronics of the display with scanning mirror and un-patterned phosphor plate according to an example.

An example of a scanned phosphor display disclosed in FIG. 2 relies on the single ultraviolet or blue laser diode, the single scanning mirror and single phosphor plate. The light source for the display is the blue or ultraviolet laser diode 210 that is driven by high frequency driver amplifier 211. The electrical modulation signals that are converted into light modulation signals are provided by the processor 212 which receives the display content from video or other digital data source 214. The processor 212 converts the standard video or image content into the format that is compatible with requirements of the scanning device 230 and the addressing of the display media that is composed of un-patterned phosphor plate 240. The monochromatic display needs only a single un-patterned plate. The full color display requires the phosphor plate 240 that is subdivided into or composed of three un-patterned phosphor segments (or sub-plates), red one, 241, green one 242 and blue one 243. Additional phosphor sub-plates can be added, such as orange sub-phosphor plate to enhance the color gamut of the displayed images. The different phosphor sub-plates 241, 242 can be arranged in any convenient pattern, such as the row or two by two pattern with transmissive or reflective configuration.

The coherent light generated by the laser diode 210 is collimated by optics 220 and directed onto the scanning mirror 230. The scanner is typically bidirectional, biaxial actuator that permits angular scanning of the light beam over two dimensional raster. Unidirectional scanner represents another viable option. Another scanning option uses two uniaxial actuators for the full two dimensional image.

The optical engine composed of the unpackaged laser diode 210, the collimated optics 220, the unpackaged scanning mirror 230 and the phosphor plate 240 is enclosed in the hermetic or non-hermetic package that protects the components against particulate contamination. The optional hermetic package can be filled with inert gas, gas containing oxygen or other desired gas dopant with lower pressure than atmospheric pressure, compressed dry air, or contain low level of vacuum if low friction operation of the scanner is desirable for higher deflection angle operation. Packaging the phosphor plate inside the module has certain benefits with respect to form factor, reliability, and cost.

A laser diode is formed in gallium and nitrogen containing epitaxial layers that have been transferred from the native gallium and nitrogen containing substrates that are described in U.S. patent application Ser. No. 14/312,427 and U.S. Patent Publication No. 2015/0140710, which are incorporated by reference herein. As an example, this technology of GaN transfer can enable lower cost, higher performance, and a more highly manufacturable process flow.

The typical scanning mirror can be two dimensional Micro-Electro-Mechanical Systems (MEMS) electrostatically or electromagnetically driven scanner. The electrostatic comb MEMS scanner 230 offers large deflection angles, high resonant frequencies and relatively high mechanical stiffness for good shock and vibration tolerance. When even higher resonant frequencies, higher scanning angles and higher immunity to shock and vibration are required, two dimensional electromagnetic scanning MEMS mirror 230 is used. Another embodiment uses two uniaxial scanning mirrors instead of one biaxial scanner. The scanning mirrors are typically operated in the resonant mode or quasi-static mode and synchronization of their displacement with the digital content modulating the lasers is required. The active sensing of the deflection angles (not shown in the figure) is included in the system. It can be accomplished by incorporation of the sensors on the hinges of the scanning mirrors. These sensors can be of piezoelectric, piezoresistive, capacitive, optical or other types. Their signal is amplified and used in the feedback loop to synchronize the motion of mirrors with the digital display or video signals.

Figure 5:
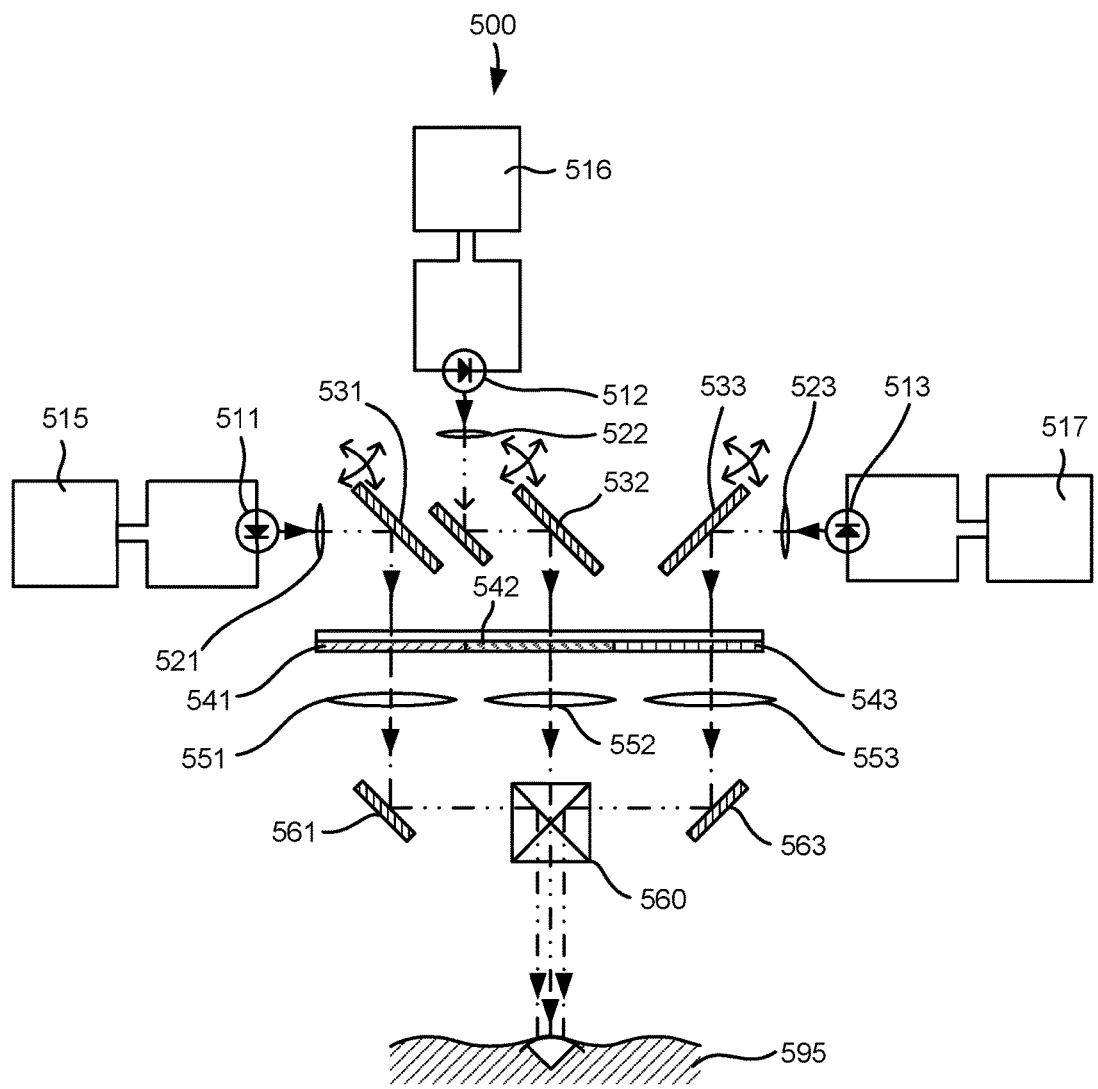
FIG. 5 illustrates an optical architecture with three laser diodes and three scanning mirrors according to an example.
Figure 6:
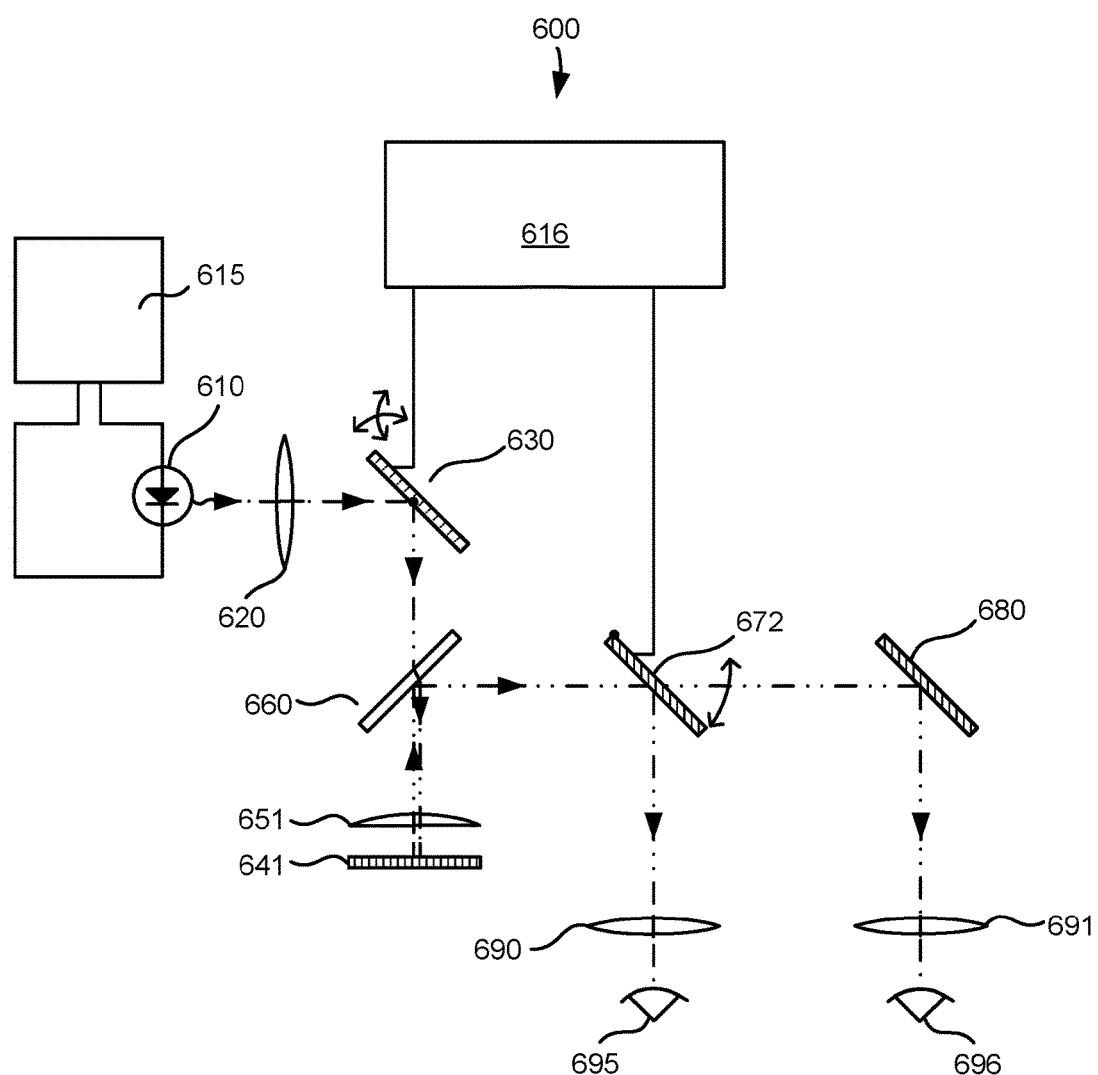
FIG. 6 illustrates a three dimensional (3D) optical architecture with a laser diode and phosphor plate configured to a scanning mirror according to an example.

The light image generated by laser beam scanning of un-patterned phosphor can be viewed directly by the observer 260 or it can be re-imaged by the optical system 250 onto the appropriate optical screen 270. For one color imaging system, the optical system 250 does not require any color light combiners, but for the full color imaging system, the optical system 250 includes also combining optics that are not shown in FIG. 2 for simplicity, but are shown in FIGS. 5 and 6 below.

Figure 3A:
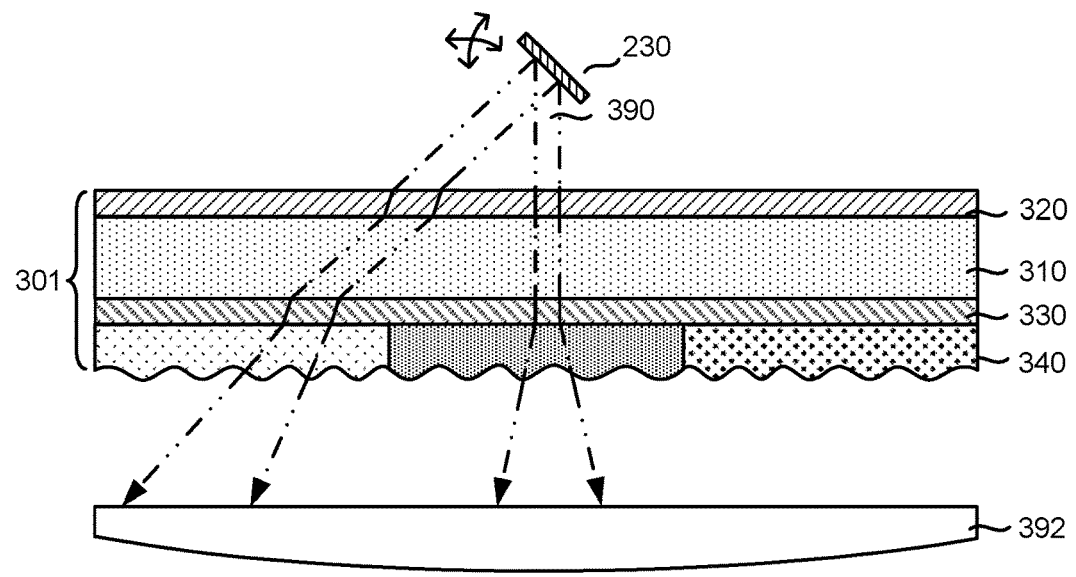
FIG. 3a illustrates the optical configuration with backside, transmission illumination and details of phosphor plate.

The details of one un-patterned phosphor plate are included in FIG. 3a. The back side illumination 390 impinges on the substrate 310 that is transparent to monochromatic laser illumination and is coated with antireflective thin film structure 320 on the illumination side. On the phosphor side of the substrate, the highly reflective layer 330 composed of the single film or multiple stack of high and low refractive index layers is used. The reflection is optimized for emission wavelengths of the phosphors so that almost all emitted light intensity is used in the forward direction. This coating is transparent at the excitation wavelength of the laser diode. The phosphor layer 340 composed of powder films, single crystal phosphors or quantum dots are selected so that efficient phosphorescence occurs for the particular excitation wavelength and emission of desirable red, green and blue wavelengths. The plate 301 can contain one, two, three or more phosphor sub-plates that are not shown in FIG. 3a. The optimized color gamut is achieved with the single phosphor or mixture of phosphors. Some examples of the phosphors for red, green, orange and blue, among others, are listed below. Images produced on the phosphor layer 340 are re-imaged with the optical system 392. The phosphor plate may contain the heat sink in particular for high brightness systems. The heat sink for transmissive configuration is formed by materials that are very good thermal conductors but are optically transparent to the illumination light.

Figure 3B:
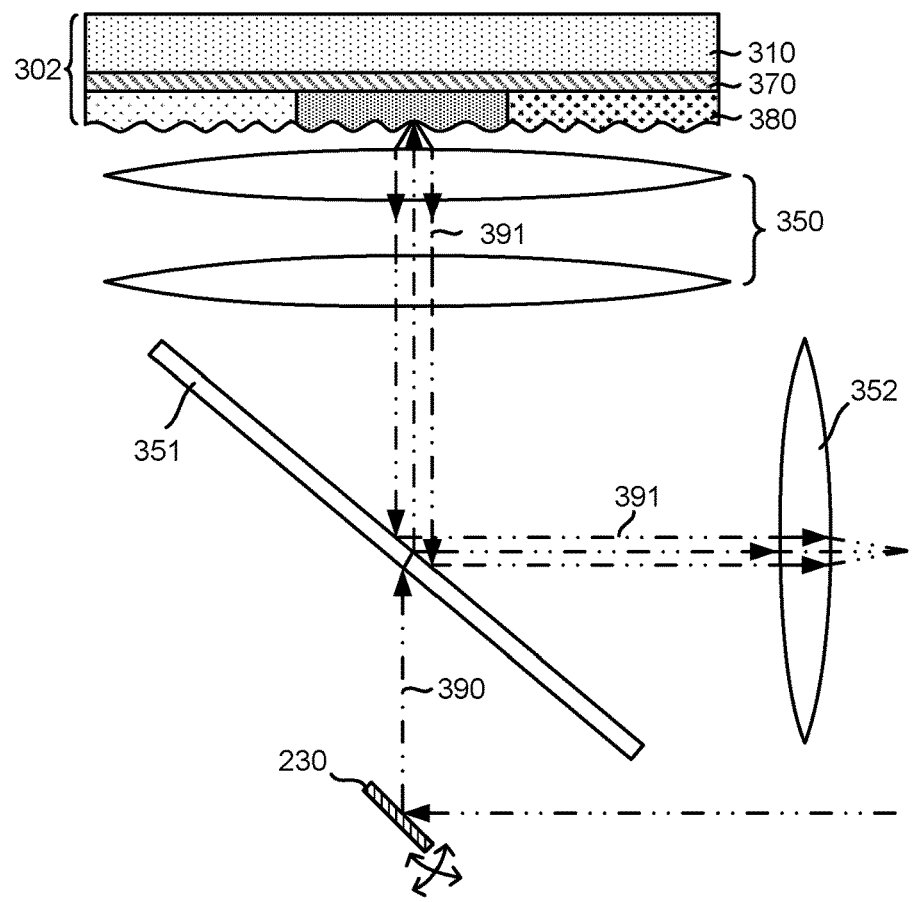
FIG. 3b illustrates the optical configuration with front side, perpendicular reflective illumination and details of the corresponding phosphor plate according to examples.

The second architecture with the phosphor plate 302 is presented in FIG. 3b. In this case, the excitation light 390 is brought in from the front side of the phosphor surface. The scanned excitation light 390 passes through dichroic mirror 351 and collection optics 350 and is directed to the phosphor plate 302 having the substrate 310. The phosphor 340 is placed on the highly reflected layer 370 which in turn resides on the substrate 310. The light 391 emitted by the phosphors 340 is collimated and imaged by the optical assembly 350 and directed to the screen or the observer by reflection from dichroic mirror 351 and by optional optical components 352.

Figure 3C:
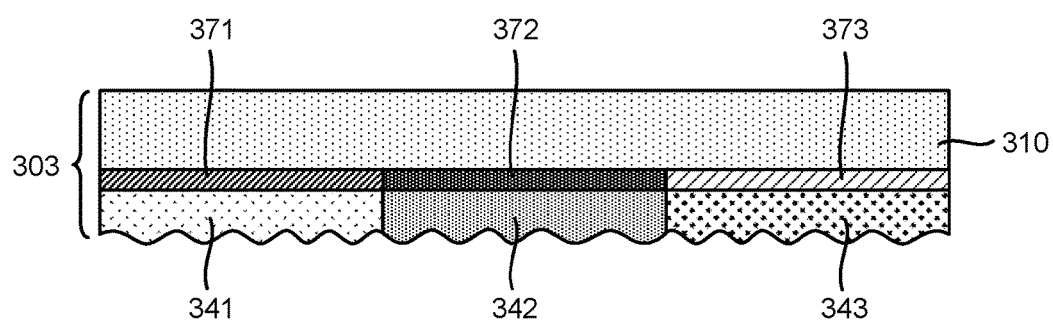
FIG. 3c illustrates a full color phosphor plate.

FIG. 3c shows the details of the full color phosphor plate 303 that comprises of the substrate 310 and phosphor films 341, 342 and 343 that are referred to here as sub-plates. The single layer or multilayer film stacks 371, 372 and 373 that reflect efficiently the phosphorescent light generated by three phosphors and also illumination light 390 reside between the substrate 310 and phosphorescent films 341, 342 and 343. Alternatively, the single film stack can be substituted for three different stacks with some loss of reflection efficiency for the emission spectra that cover three spectral regions. The reflective phosphor plates may contain heat sink film that is placed below phosphors 341, 342, 343 or below reflective layers 371, 372, 373. In some cases, heat sink film functionality can be combined with reflection films.

Figure 4:
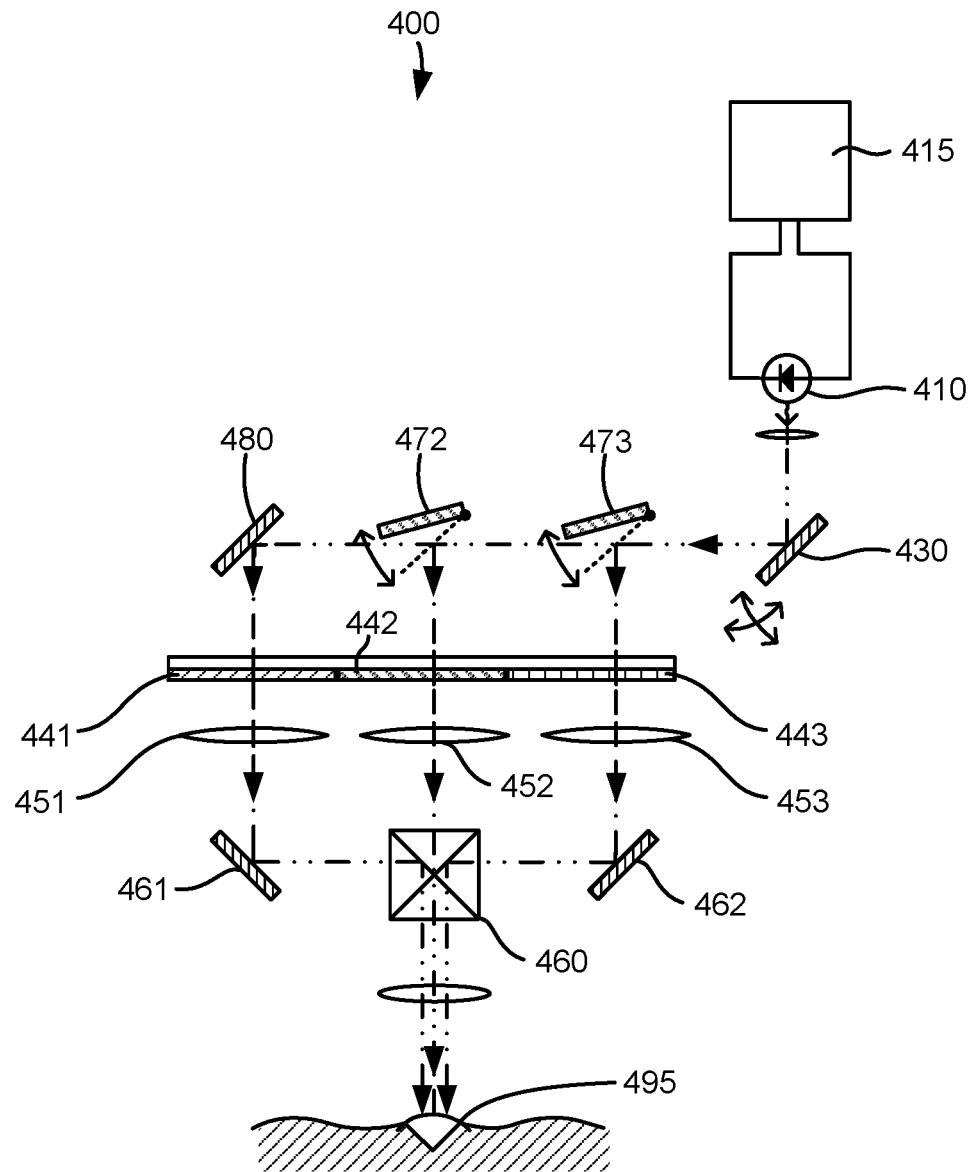
FIG. 4 illustrates an optical architecture with one laser diode, one scanning mirror and two uniaxial on-off mirrors according to an example.

The full color display architecture 400 with three color sub-plates is shown in FIG. 4. The modulated light is generated by the laser diode 410 that is driven by the laser driver, video processing electronics according to input data represented by the unit 415 which has equivalent functionality to the unit 215 in FIG. 2. The scanning mirror 430 provides the scanning pattern over the phosphors 441, 442 and 443. The two state (on-off) mirror 473 allows the excitation light to be guided onto the first phosphor 443 when it is in the on-state. When the mirror 473 is in the off-state and mirror 472 is switched into on-state, the excitation light is directed onto the second phosphor 442. When both mirrors 473 and 472 are in the off-state, the excitation light falls onto the fixed mirror 480 that brings the light onto the third phosphor 441. The light emitted by the phosphors 441, 442 and 443 is imaged by the optical systems 451, 452, 453 and directed for recombination into one beam by using mirrors 461 and 462 and combining cube 460. The images are formed on the eye of the observer or on the screen 495.

Additional design and performance flexibility can be achieved by adding additional light sources and the scanning mirrors to the basic architectures described above. The option with additional optical elements is of particular interest when the displays or smart lighting are intended for high brightness applications that cannot be satisfied by the single light source with the highest available power. The architecture of such a design is shown in FIG. 5. The display medium is the same as disclosed in FIG. 3c with three phosphor segments 541, 542 and 543. The transmission, back side illumination is selected here for illustration of one typical architecture, even though other illumination options can be used such as reflection, front side illumination in FIG. 3b. When higher display brightness than brightness that can be provided with the highest single laser power output and phosphor combination is needed, additional laser diodes can be added. Three laser diodes 511, 512 and 513 with ultraviolet or blue wavelength may serve as light sources. The laser diodes are driven with electronic circuits 515, 516 and 517. The elements of these circuits have been disclosed earlier, with description of FIG. 2. The laser light from the laser diodes 511, 512 and 513 is collimated with optical elements 521, 522 and 523 respectively. The collimated, modulated light trains are directed to three scanning mirrors 531, 532 and 533 that address the phosphors 541, 542 and 543. This type of addressing is referred to herein as simultaneous color addressing. The data rates to modulate the laser diodes can be at least three times slower than color sequential addressing data rates disclosed in FIG. 4. Moreover, the scanning mirror resonant frequencies for the fast axis can be three times lower than the frequencies required for sequential color addressing of FIG. 4. Light emitted by phosphors 541, 542 and 543 is collected by optical subsystems 551, 552 and 553 described earlier. The superposition of these three color beams is accomplished by right angle static mirrors 561 and 563 and cube color combiner 560. The color images or video are then directed to the screen 595 or directly to the observer.

This embodiment has more optical components but less challenging requirements on laser modulation frequencies and scanning angles. In addition, optical architecture of FIG. 5 is very suitable for high brightness applications. The laser diodes 511, 512 and 513 can be nominally the same lasers with the same emission wavelength. The power rating of the laser diodes can be selected so that desired brightness and color gamut are achieved on the screen. Alternatively, the laser diodes 511, 512 and 513 can have different emission wavelengths that provide higher conversion efficiency of phosphor emission. The cooling of phosphors or their motion on color wheel is typically not required, as the energy input from the laser diodes is naturally distributed over the whole area of phosphors by scanning of these laser beams. These phosphor based displays do not present any safety issue because highly collimated, low divergence laser beams are transferred into divergent light beams by phosphorescence. This contrasts with direct laser scanners of FIG. 1 that form images with highly parallel beams and require significant laser safety measures to avoid accidental direct eye exposures.

Another embodiment places phosphor(s) directly on the scanning mirror surface. In this case, the separate phosphor plates 541, 542 and 543 are not required in FIG. 5.

Different elements and features from the described architectures can be combined in other ways to create other designs suitable for the specific applications. In various embodiment, the blue laser diode can be polar, semipolar, and non-polar. Similarly, green laser diode can be polar, semipolar, and non-polar. For example, blue and/or green diodes are manufactured from bulk substrate containing gallium nitride material. For example, following combinations of laser diodes are provided, but there could be others: Blue polar+Green nonpolar+Red*AlInGaP, Blue polar+Green semipolar+Red*AlInGaP, Blue polar+Green polar+Red*AlInGaP, Blue semipolar+Green nonpolar+Red*AlInGaP, Blue semipolar+Green semipolar+Red*AlInGaP, Blue semipolar+Green polar+Red*AlInGaP, Blue nonpolar+Green nonpolar+Red*AlInGaP, Blue nonpolar+Green semipolar+Red*AlInGaP, Blue nonpolar+Green polar+Red*AlInGaP. In an alternative embodiment, the light source comprises a single laser diode. For example, the light source comprises a blue laser diode that outputs blue laser beams. The light source also includes one or more optical members that change the blue color of the laser beam. For example, the one or more optical members include phosphor material. It is to be appreciated that the light source may include laser diodes and/or Light Emitting Diodes (LEDs). In one embodiment, the light source includes laser diodes in different colors. In another embodiment, the light source includes one or more colored LEDs. In yet another embodiment, light source includes both laser diodes and LEDs.

In various embodiments, laser diodes are utilized in 3D display applications. Typically, 3D display systems rely on the stereoscopic principle, where stereoscopic technology uses a separate device for person viewing the scene which provides a different image to the person's left and right eyes. Example of this technology is shown in FIG. 6. Even though several different embodiments are useful. The architecture which is the simplest optically but more complex electrically is shown in FIG. 6 with the single 2D scanning mirror 630 and the single phosphor plate 641. The other architectures comprise two 2D scanning mirrors and two phosphor plates that generate two images for two eyes independently but in synchronization. More complex optical architecture can comprise six 2D scanning mirrors, six phosphor plate and three image combiners, where each two phosphor plates provide one color for the image. This architecture has the easiest requirements on data rates, scanning rates of the mirrors and bandwidth of the driving electronics.

The architecture 600 of 3D display further includes the light source 610 with the power modulating electronics 615. The light from the light source 610 is collimated by optical components 620 and directed onto 2D biaxial mirror scanner 630. The light rastered by the scanner passes through the dichroic mirror 660 and the optical assembly 651 that focuses the incident light on the phosphor plate 641 which is implemented here in the reflection configuration. One color display requires only a single color phosphor while the full color display requires at least three phosphor sub-plates that form the complete phosphor plate, as disclosed above in FIG. 3c. The light emitted by the phosphor 641 in re-imaged with the optical assemble 651, reflected from the dichroic mirror 660 onto two state (on-off) MEMS mirror 672. When the image is supposed to be directed to the left eye 695 of the observer, then the mirror 672 is in the on position. When the image is intended for the right eye 696 of the observer, the mirror 672 is in the off position and light is directed through the optical element 690. In that case, the light falls onto the fixed mirror 680 which reflects it through the lens 691 to the right eye 696 of the observer. The scanning mirrors 630 and 672 are controlled by the electronic circuits 616 that receive the feedback signals from the sensors on the mirrors 630 and 680 about their positions. The servo circuits that are not shown in FIG. 6 then adjust the electrical signals to the mirrors so that the video data that is streamed into the laser source 610 is synchronized with the mirror positions.

In other embodiments, the present invention includes a device and method configured on other gallium and nitrogen containing substrate orientations. In a specific embodiment, the gallium and nitrogen containing substrate is configured on a family of planes including a {20-21} crystal orientation. In a specific embodiment, {20-21} is 14.9 degrees off of the m-plane towards the c-plane (0001). As an example, the miscut or off-cut angle is +/−17 degrees from the m-plane towards c-plane or alternatively at about the {20-21} crystal orientation plane. As another example, the present device includes a laser stripe oriented in a projection of the c-direction, which is perpendicular to the a-direction (or alternatively on the m-plane, it is configured in the c-direction). In one or more embodiments, the cleaved facet would be the gallium and nitrogen containing face (e.g., GaN face) that is 1-5 degrees from a direction orthogonal to the projection of the c-direction (or alternatively, for the m-plane laser, it is the c-face).

As used herein, the term GaN substrate is associated with Group III-nitride based materials including GaN, InGaN, AlGaN, or other Group III containing alloys or compositions that are used as starting materials. Such starting materials include polar GaN substrates (i.e., substrate where the largest area surface is nominally an (h k l) plane wherein h=k=0, and l is non-zero), non-polar GaN substrates (i.e., substrate material where the largest area surface is oriented at an angle ranging from about 80-100 degrees from the polar orientation described above towards an (h k l) plane wherein l=0, and at least one of h and k is non-zero) or semi-polar GaN substrates (i.e., substrate material where the largest area surface is oriented at an angle ranging from about 0.1 to 80 degrees or 110-179.9 degrees from the polar orientation described above towards an (h k l) plane wherein l=0, and at least one of h and k is non-zero). The laser diode can be enclosed in a suitable package. Such package can include those such as in TO-38 and TO-56 headers. Other suitable package designs and methods can also exist, such as TO-9 and even non-standard packaging. In a specific embodiment, the present device can be implemented in a co-packaging configuration such as those described in U.S. Provisional Application No. 61/347,800, commonly assigned, and hereby incorporated by reference for all purposes.

In other embodiments, some or all components of these optical engines, including the bare (unpackaged) light sources and scanning mirrors can be packaged in the common package hermetically or non-hermetically, with or without specific atmosphere in the package. In other embodiments, the present laser device can be configured in a variety of applications. Such applications include laser displays, metrology, communications, health care and surgery, information technology, and others. As an example, the present laser device can be provided in a laser display such as those described in U.S. Ser. No. 12/789,303 filed May 27, 2010, which claims priority to U.S. Provisional Nos. 61/182,105 filed May 29, 2009 and 61/182,106 filed May 29, 2009, each of which is hereby incorporated by reference herein. Of course, there can be other variations, modifications, and alternatives.

In an example, the present invention provides a method and device for emitting electromagnetic radiation using non-polar or semipolar gallium containing substrates such as GaN, AlN, InN, InGaN, AlGaN, and AlInGaN, and others. The invention can be applied to optical devices, lasers, light emitting diodes, solar cells, photoelectrochemical water splitting and hydrogen generation, photodetectors, integrated circuits, and transistors, among other devices.

In an example, a phosphor, or phosphor blend or phosphor single crystal can be selected from one or more of (Y, Gd, Tb, Sc, Lu, La).sub.3(Al, Ga, In).sub.5O.sub.12:Ce.sup.3+, SrGa.sub.2S.sub.4:Eu.sup.2+, SrS:Eu.sup.2+, and colloidal quantum dot thin films comprising CdTe, ZnS, ZnSe, ZnTe, CdSe, or CdTe. In an example, a phosphor is capable of emitting substantially red light, wherein the phosphor is selected from one or more of the group consisting of (Gd,Y,Lu,La).sub.2O.sub.3:Eu.sup.3+, Bi.sup.3+; (Gd,Y, Lu,La).sub.2O.sub.2S:Eu.sup.3+, Bi.sup.3+; (Gd,Y,Lu,La) VO.sub.4:Eu.sup.3+, Bi.sup.3+; Y.sub.2(O,S).sub.3: Eu.sup.3+; Ca.sub.1-xMo.sub.1-ySi.sub.yO.sub.4: where 0.05.ltoreq.x.1toreq.0.5, 0.ltoreq.y.1toreq.0.1; (Li,Na, K).sub.5Eu(W,Mo)O.sub.4; (Ca,Sr)S:Eu.sup.2+; SrY.sub.2S.sub.4:Eu.sup.2+; CaLa.sub.2S.sub.4:Ce.sup.3+; (Ca,Sr)S:Eu.sup.2+; 3.5MgO*0.5MgF.sub.2*GeO.sub.2: Mn.sup.4+(MFG); (Ba,Sr,Ca)Mg.sub.xP.sub.2O.sub.7: Eu.sup.2+, Mn.sup.2+; (Y,Lu).sub.2WO.sub.6:Eu.sup.3+, Mo.sup.6+; (Ba,Sr,Ca).sub.3Mg.sub.xSi.sub.2O.sub.8: Eu.sup.2+, Mn.sup.2+, wherein 1<x.ltoreq.2; (RE.sub.1-yCe.sub.y)Mg.sub.2-xLi.sub.xSi.sub.3-xPxO.sub.12, where RE is at least one of Sc, Lu, Gd, Y, and Tb, 0.0001<x<0.1 and 0.001<y<0.1; (Y, Gd, Lu, La).sub.2-xEu.sub.xW.sub.1-yMo.sub.yO.sub.6, where 0.5.ltoreq.x.ltoreq.1.0, 0.01.ltoreq.y.ltoreq.1.0; (SrCa).sub.1-xEu.sub.xSi.sub.5N.sub.8, where 0.01.ltoreq.x.ltoreq.0.3; SrZnO.sub.2:Sm.sup.+3; M.sub.mO.sub.nX, wherein M is selected from the group of Sc, Y, a lanthanide, an alkali earth metal and mixtures thereof; X is a halogen; 1.ltoreq.m.1-toreq.3; and 1.ltoreq.n.ltoreq.4, and wherein the lanthanide doping level can range from 0.1 to 40% spectral weight; and Eu.sup.3+ activated phosphate or borate phosphors; and mixtures thereof. Further details of other phosphor species and related techniques can be found in U.S. Pat. No. 8,956,894, in the names of Raring, et al. issued Feb. 17, 2015, and titled Light devices using non-polar or semipolar gallium containing materials and phosphors, which is commonly owned, and hereby incorporated by reference herein.

Although the above has been described in terms of an embodiment of a specific package, there can be many variations, alternatives, and modifications. As an example, the laser or LED device can be configured in a variety of packages such as cylindrical, surface mount, power, lamp, flip-chip, star, array, strip, or geometries that rely on lenses (silicone, glass) or sub-mounts (ceramic, silicon, metal, composite). Alternatively, the package can be any variations of these packages. In other embodiments, the packaged device can include other types of optical and/or electronic devices. As an example, the optical devices can be OLED, a laser, a nanoparticle optical device, and others. In other embodiments, the electronic device can include an integrated circuit, a sensor, a micro-machined electronic mechanical system, or any combination of these, and the like. In a specific embodiment, the packaged device can be coupled to a rectifier to convert alternating current power to direct current, which is suitable for the packaged device. The rectifier can be coupled to a suitable base, such as an Edison screw such as E27 or E14, bipin base such as MR16 or GU5.3, or a bayonet mount such as GU10, or others. In other embodiments, the rectifier can be spatially separated from the packaged device. Additionally, the present packaged device can be provided in a variety of applications. In a preferred embodiment, the application is general lighting, which includes buildings for offices, housing, outdoor lighting, stadium lighting, and others. Alternatively, the applications can be for display, such as those used for computing applications, televisions, flat panels, micro-displays, and others. Still further, the applications can include automotive, gaming, and others. In a specific embodiment, the present devices are configured to achieve spatial uniformity. That is, diffusers can be added to the encapsulant to achieve spatial uniformity. Depending upon the embodiment, the diffusers can include TiO.sub.2, CaF.sub.2, SiO.sub.2, CaCO.sub.3, BaSO.sub.4, and others, which are optically transparent and have a different index than the encapsulant causing the light to reflect, refract, and scatter to make the far field pattern more uniform. Of course, there can be other variations, modifications, and alternatives.

Figure 7A:
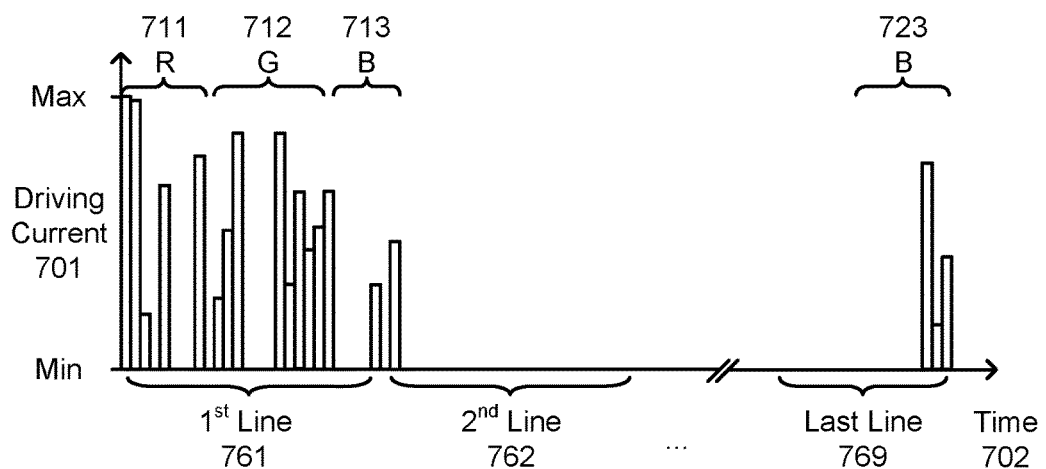
FIG. 7a illustrates the driving waveforms for addressing of un-patterned phosphor display.
Figure 7B:
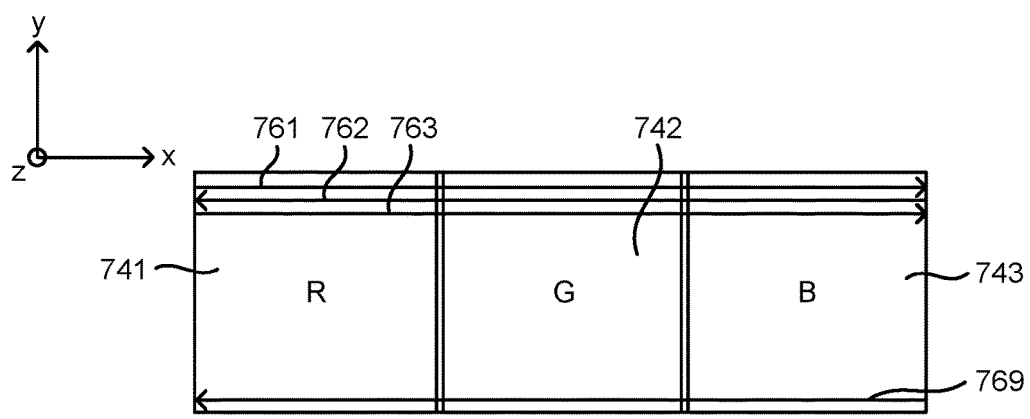
FIG. 7b illustrates the scanning line pattern over three un-patterned phosphor plates according to examples.

The addressing of the phosphor plates can be performed in multiple ways, as outlined in FIG. 7. The first addressing option is color sequential, line by line alternative, with fast scanning in one direction (e.g., fast x direction) and slower scanning in the second direction (e.g., slow y direction). In this case, the scanning mirror 230 undergoes the line by line raster over the full width of the phosphor plate 240 in back and forth manner. If the phosphor plate 240 has three distinct RGB phosphors 241, 242 and 243, then the driving waveform will be as schematically shown in FIG. 7, where the first set of driving currents 711 generates the corresponding desired laser intensities on the first line 761 of the red sub-plate 741, followed by the second set of driving currents 712 that generates the desired laser intensities on the first line 761 of the green sub-plate 742, followed by the third set of driving currents 713 for the blue sub-plate 743. When the second line 762 of the display image is being formed using the small displacement of the scanner along the slow y axis and another scan of the mirror in the opposite x direction, the second set of driving current waveforms is supplied to the laser diode to form the second line 762 of the image in the reverse sequence with blue, green and red. This addressing process is continued until the full image frame has been generated with the last line 769 having the last set of current pulses 723 for blue phosphor plate. The addressing is line by line, color sequential addressing. Multiple lasers can be combined in such configurations, for applications requiring higher optical output.

The addressing scheme can be altered to accommodate frame by frame, color sequential addressing. In this case, the first color frame, such as red frame is fully defined, followed by the green and blue frames. The scanning mirror 230 scans over the first phosphor (e.g., red) 741 completely and then continues scanning over the second phosphor (e.g., green) 742 fully and it completes the first color image frame by scanning over the full third phosphor (e.g., blue) 743 plate. The sequencing of the phosphor illumination can be optimized for thermal performance of the phosphor, to avoid overheating and to maximize the efficiency and reliability of the system. The optical architecture of FIG. 5 with the multiple scanners allows simultaneous color addressing where the addressing proceeds the same way as described above except that the primary color waveforms 711, 712 and 713 are used simultaneously and the primary color beam scanning in FIG. 7b over the sub-plates 741, 742 and 743 occurs simultaneously.

Figure 8:
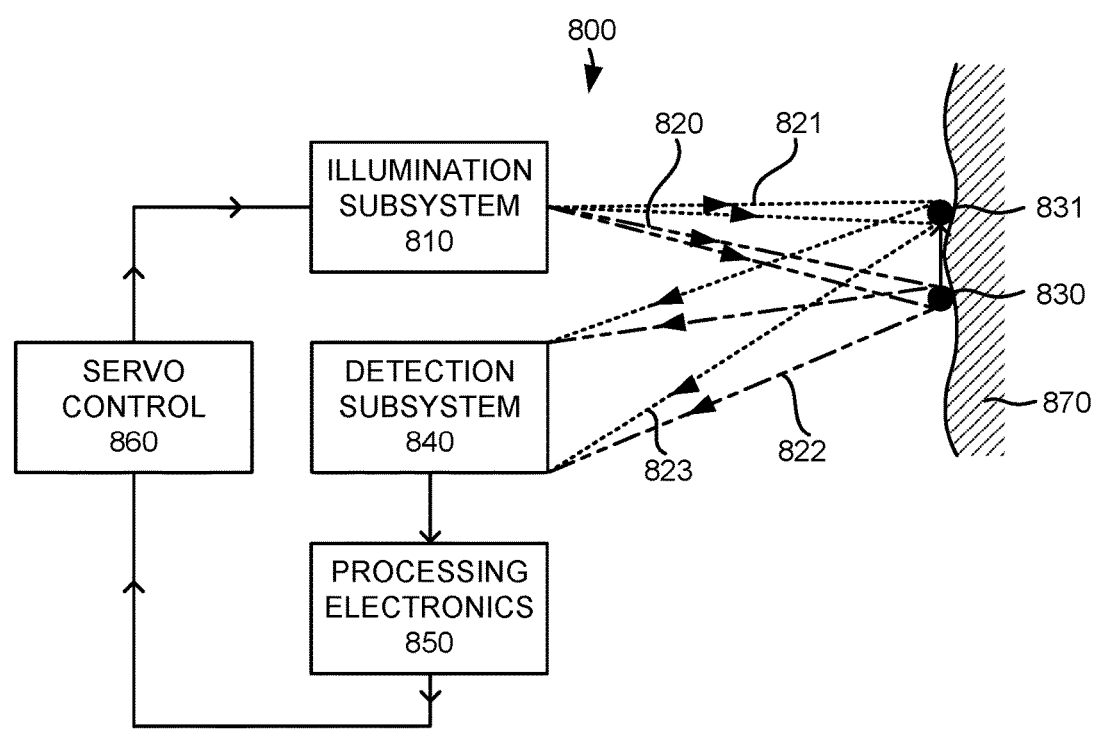
FIG. 8 illustrates a system for dynamic lighting with the feedback mechanism to follow the moving target according to an example.

The smart dynamic illumination system 800 based on disclosed illumination technology and the display or sensor technologies is presented in FIG. 8, which shows the key architectural blocks of the system. The illumination subsystem 810 can be white, one color or multicolor, as described in FIGS. 2 to 5. The illumination beam 820 or 821 is directed toward the specific target 830 or background 870 that might contain the intended target to be followed with illumination beam. The detection subsystem 840 can be a simple multi-element array of photosensors that respond in the visible part of the spectrum (0.4 to 0.7 um), such as the small CMOS or CCD array, or infrared spectrum, such as infrared sensor array or microbolometer array sensitive at spectral wavelengths from 0.3 to 15 um. Alternatively, the subsystem 840 can be the full imaging array, sensitive in visible or infrared part of the spectrum. Other motion sensors that are based on non-imaging principles can also be used. The motion related signals or full visible or infrared images are analyzed with the processing electronics 850 and the data are directed to the servo control electronics 860. In turn, the servo subsystem 860 generates the feedback signals and controls the scanning mirror(s) and lasers of illumination system 810. In this manner, the target can be followed with dynamic illumination, including the control of the intensity, color and time duration of the illumination as shown in FIG. 8.

When the target moves from the position 830 to the position 831, the light 822 reflected and scattered by the target changes to the light beams 823. The change in the light beams or the images that they represent, are detected by the detection subsystem and fed into the processing electronics 850 and servo control 860 which controls the illumination beams by moving them from the position 830 to the position 831, effectively keeping the illumination beam directed on the target at all times. When the illumination is outside of the visible spectrum, the target may not be aware that it is monitored and followed which may be advantageous in some security applications.

The complete dynamic illumination system can be mounted on the stationary platforms in offices, homes, galleries, etc. or can be employed in the movable systems such as automobiles, planes and drones.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of using an optical engine apparatus for selective resolution, the method comprising:
   in the optical engine apparatus comprising: a laser diode device, characterized by a wavelength; a lens coupled to an output of the laser diode device; a scanning mirror device operably coupled to the laser diode device; an un-patterned phosphor plate coupled to the scanning mirror device and configured with the laser diode device; and a controller coupled to the laser diode device and the scanning mirror device;
   forming a first spatial image having a first resolution on a first portion of the un-patterned phosphor plate by a modulation of the laser diode device and movement of the scanning mirror device;
   forming a second spatial image having a second resolution on a second portion of the un-patterned phosphor plate, the second resolution being different than the first resolution,
   wherein the second spatial image is formed concurrently with the first spatial image on the un-patterned phosphor plate.

2. The method of claim 1 wherein the un-patterned phosphor plate comprises a multi-element phosphor species, the multi-element phosphor species comprises a red phosphor, a green phosphor, and a blue phosphor.

3. The method of claim 1 wherein the un-patterned phosphor plate comprises a plurality of multi-element phosphor plates, and the scanning mirror device comprises a plurality of scanning mirrors.

4. The method of claim 1 wherein the apparatus is configured with a display system.

5. The method of claim 1 further comprising a heat sink device coupled to the un-patterned phosphor plate such that thermal energy is transferred and removed using the heat sink device; and wherein the un-patterned phosphor plate includes at least one of a transmissive phosphor species or a reflective phosphor species.

6. The method of claim 1 further comprising:
   a sensor or imager, and
   feedback and servo controls to track and dynamically illuminate an object of interest.

7. A method of using an optical engine apparatus, the method comprising:
   in the optical engine apparatus comprising: a laser diode device, characterized by a wavelength; a lens coupled to an output of the laser diode device; a scanning mirror device operably coupled to the laser diode device; an un-patterned phosphor plate coupled to the scanning mirror device and configured with the laser device; and a controller coupled to the laser diode device and the scanning mirror device;
   forming a first spatial image on a first portion of the un-patterned phosphor plate by a modulation of the laser diode device and movement of the scanning mirror device; a first resolution associated with the first spatial image, the first resolution being selected from one of a plurality of pre-determined resolutions, the first resolution being provided by a control parameter associated with the first spatial image;
   forming a second spatial image on a second portion of the un-patterned phosphor plate; a second resolution associated with the second spatial image, the second resolution being different than the first resolution and a color of the second spatial image being different than a color of the first spatial image,
   wherein the second spatial image is formed concurrently with the first spatial image on the un-patterned phosphor plate,
   wherein the first spatial image is characterized by a time constant,
   wherein the control parameter is provided by the controller, and
   wherein the first spatial image is speckle free.

8. The method of claim 7 wherein the un-patterned phosphor plate comprises a plurality of plates and the scanning mirror device comprises a plurality of scanning mirrors.

9. The method of claim 7 wherein the apparatus is configured with a display system.

10. The method of claim 7 wherein the un-patterned phosphor plate comprises a red phosphor, a green phosphor, or a blue phosphor within a spatial region of the un-patterned phosphor plate.

11. The method of claim 7 further comprising a heat sink device coupled to the un-patterned phosphor plate such that thermal energy is transferred and removed using the heat sink device; and wherein the un-patterned phosphor plate includes at least one of a transmissive phosphor species or a reflective phosphor species.

12. The method of claim 7 further comprising a color or colors associated with the first spatial image, the color or colors being associated with the modulation of the laser device and movement of the scanning mirror device.

13. The method of claim 7 further comprising a beam path provided from the scanning mirror device, wherein the un-patterned phosphor plate comprises:
- a first un-patterned phosphor plate coupled to the scanning mirror device via the beam path and configured with the laser diode device;
- a second un-patterned phosphor plate coupled to the scanning mirror device via the beam path and configured with the laser diode device;
- a third un-patterned phosphor plate coupled to the scanning mirror device via the beam path and configured with the laser diode device, wherein the first spatial image is formed on a first portion of either the first un-patterned phosphor plate, the second un-patterned phosphor plate, or the third un-patterned phosphor plate, and the first spatial image is configured by a modulation of the laser diode device and movement of the scanning mirror device.

14. The method of claim 13 further comprising a first blocking mirror configured in a first portion of the beam path to configure the beam path to the first un-patterned phosphor plate, and a second blocking mirror configured to a second portion of the beam path to configure the beam path to the second un-patterned phosphor plate.

15. A method of using an optical engine apparatus for selective resolution, the method comprising:
- in the optical engine apparatus comprising: a laser diode device, characterized by a wavelength;
- a lens coupled to an output of the laser diode device;
- a scanning mirror device with phosphor on its surface, operably coupled to the laser diode device;
- an un-patterned phosphor plate coupled to the scanning mirror device and the laser diode device; and
- a controller coupled to the laser diode device and the scanning mirror device;
    - forming a first spatial image having a first resolution and a first color on a first portion of the un-patterned phosphor plate by a modulation of the laser diode device and movement of the scanning mirror device;
    - forming a second spatial image having a second resolution and a second color on a second portion of the un-patterned phosphor plate, the second resolution being different than the first resolution and the second color being different than the first color,
- wherein the second spatial image is formed concurrently with the first spatial image on the un-patterned phosphor plate.

* * * * *